United States Patent
Ho

(10) Patent No.: US 10,303,272 B2
(45) Date of Patent: May 28, 2019

(54) TOUCH SENSITIVE ELECTRONIC SYSTEM, PROCESSING APPARATUS AND METHOD THEREOF FOR SIMULATING STYLUS AS JOYSTICK

(71) Applicant: EGALAX_EMPIA TECHNOLOGY INC., Taipei (TW)

(72) Inventor: Shun-Lung Ho, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 15/723,274

(22) Filed: Oct. 3, 2017

(65) Prior Publication Data

US 2018/0095556 A1    Apr. 5, 2018

Related U.S. Application Data

(60) Provisional application No. 62/403,907, filed on Oct. 4, 2016.

(51) Int. Cl.
| | | |
|---|---|---|
| *G06F 3/038* | (2013.01) | |
| *G06F 3/0354* | (2013.01) | |
| *G06F 3/0338* | (2013.01) | |
| *G06F 3/041* | (2006.01) | |
| *G06F 3/01* | (2006.01) | |

(52) U.S. Cl.
CPC ......... *G06F 3/03545* (2013.01); *G06F 3/016* (2013.01); *G06F 3/038* (2013.01); *G06F 3/0338* (2013.01); *G06F 3/0414* (2013.01); *G06F 2203/014* (2013.01); *G06F 2203/015* (2013.01)

(58) Field of Classification Search
CPC .......................... G06F 3/03545; G06F 3/0338; G06F 3/0414
USPC ........................................................ 345/173
See application file for complete search history.

(56) References Cited

U.S. PATENT DOCUMENTS

| | | | |
|---|---|---|---|
| 7,319,458 B2 | 1/2008 | An et al. | |
| 9,195,351 B1 * | 11/2015 | Rosenberg | ............ G06F 1/1626 |
| 2014/0253521 A1 * | 9/2014 | Hicks | ................. G06F 3/03545 |
| | | | 345/179 |

FOREIGN PATENT DOCUMENTS

| | | |
|---|---|---|
| CN | 101154135 A | 4/2008 |
| TW | M265714 | 5/2005 |
| TW | M452381 | 5/2013 |

* cited by examiner

*Primary Examiner* — Jennifer Mehmood
*Assistant Examiner* — Ngan T Pham Lu
(74) *Attorney, Agent, or Firm* — WPAT, PC

(57) ABSTRACT

A touch sensitive method for simulating a stylus as a joystick, comprises: maintaining a mode parameter for recording an operating mode of the stylus; detecting, by a touch panel, a position, an axial direction and a tilt angle of the stylus with respect to the touch panel; and when the mode parameter indicates a joystick mode, converting the axial direction and the tilt angle into a first-axis tilt angle and a second-axis tilt angle and transmitting the first-axis tilt angle and the second-axis tilt angle to an application via a joystick driver, when the mode parameter indicates a stylus mode, transmitting the position to a touch sensitive driver, wherein the joystick driver, the touch sensitive driver and the application are executed under an operating system environment run by a central processing unit of a host.

33 Claims, 10 Drawing Sheets

TOUCH SENSITIVE ELECTRONIC SYSTEM, PROCESSING APPARATUS AND METHOD THEREOF FOR SIMULATING STYLUS AS JOYSTICK

CROSS REFERENCES TO RELATED APPLICATION

The application claims the benefit of U.S. provisional patent application No. 62/403,907, filed on Oct. 4, 2016.

FIELD OF THE INVENTION

The present application is related to a touch sensitive system, and more particularly, to a touch sensitive system for determining a tilt angle and an axial direction of a stylus with respect to a touch panel.

BACKGROUND OF THE INVENTION

There are increasing numbers of modern electronic apparatuses using touch panels or touch screens as their main input/output (I/O) devices. These touch panels/screens are capable of detecting fingers as well as pen-shaped devices (i.e. styli). Styli allow more accurate input of positions since they are typically thinner than fingers.

Some applications require the use of another kind of input device, joysticks, such as computer-aided design (CAD) software, flight simulation games or other types of games. For flight simulation games, joysticks can be used to control two axes: roll and pitch, and with the cooperation of another input device such as a keyboard or a touch panel, yaw and throttle can also be controlled. As such, the motions of an airplane in three dimensional space can be completely simulated.

FIG. 1 shows FIG. 7 of U.S. Pat. No. 6,429,849, which is a schematic diagram depicting a conventional joystick. It can be seen that there are complicated mechanics underneath a joystick handle 123 for determining and outputting angular displacements about X, Y and Z axes. Accordingly, an axial direction and a tilt angle of the joystick handle 123 can be derived. For convenience, when the handle 123 is positioned in the center with no force applied, the angular displacements about the X, Y and Z axes are all zero. Meanwhile, the handle 123 is parallel to the Z axis and perpendicular to the XY plane.

When the handle 123 experiences a force and moves in a direction indicated by F, there is an angular displacement about the X axis. When the handle 123 experiences a force and moves in direction indicated by L, there is an angular displacement about the Y axis. When the angular displacement of at least one of X and Y axes is not zero, the handle 123 will have a tilt angle and an axial direction with respect to the XY plane. In other words, the angular displacements about the X and Y axes can be converted into a tilt angle and an axial direction of the handle 123. On the contrary, if a tilt angle and an axial direction of the handle 123 are known, then the angular displacements about the X and Y axes can be calculated.

It can be seen from FIG. 1, conventional joysticks are often equipped with a large amount of components. As there are a considerable amount of movable parts, conventional joysticks may be easily broken. This is even more so if the joysticks are not used with care. Moreover, the prices of these joysticks are relatively low, which increases the probability of being thrown away once they are broken. Therefore, there is a need for a touch sensitive system that allows a stylus to be used as a joystick, such that users only need one type of device to achieve multiple types of control methods and input experiences.

SUMMARY OF THE INVENTION

According to an embodiment of the present invention, an electronic system is provided for simulating a stylus as a joystick, which may include: a host including a memory and a central processing unit (CPU) connected with the memory, the CPU being configured for executing an operating system, a joystick driver and a touch sensitive driver run under the operating system, and an application connected to the joystick driver; the stylus; a touch panel; and a touch sensitive processing apparatus connected with the touch panel and the CPU for determining, via the touch panel, a position, an axial direction and a tilt angle of the stylus with respect to the touch panel, wherein the touch sensitive processing apparatus maintains a mode parameter to record an operating mode of the stylus, when the mode parameter indicates a joystick mode, the touch sensitive processing apparatus converts the axial direction and the tilt angle of the stylus into a first-axis tilt angle and a second-axis tilt angle, and transmits the first-axis and second-axis tilt angles to the application via the joystick driver, when the mode parameter indicates a stylus mode, the touch sensitive processing apparatus transmits the position to the touch sensitive driver.

According to an embodiment of the present invention, a touch sensitive processing apparatus for simulating a stylus as a joystick is provided, which may include: a touch panel interface connected with electrodes of a touch panel; a host interface connected with a central processing unit (CPU) of a host, the CPU being configured for executing an operating system, a joystick driver and a touch sensitive driver run under the operating system, and an application connected to the joystick driver; and a microprocessor connected with the touch panel interface and the host interface for determining, via the touch panel, a position, an axial direction and a tilt angle of a stylus with respect to the touch panel, wherein the microprocessor maintains a mode parameter to record an operating mode of the stylus, when the mode parameter indicates a joystick mode, the microprocessor converts the axial direction and the tilt angle of the stylus into a first-axis tilt angle and a second-axis tilt angle, and transmits the first-axis and second-axis tilt angles to the application via the joystick driver, when the mode parameter indicates a stylus mode, the microprocessor transmits the position to the touch sensitive driver.

According to an embodiment of the present invention, a stylus to be simulated as a joystick is provided, which may include: a first end; and a second end opposite to the first end, wherein the first end and the second end have different touch sensitive areas, shapes or directionalities, such that a touch sensitive processing apparatus knows whether the first end or the second end of the stylus is touching a touch panel, when the first end is touching the touch panel, the stylus is simulated as a joystick.

According to an embodiment of the present invention, a stylus to be simulated as a joystick is provided, which may include: a first end; and a second end opposite to the first end, wherein the first end and the second end emit different electrical signals, such that a touch sensitive processing apparatus knows whether the first end or the second end of the stylus is touching a touch panel, when the first end is touching the touch panel, the stylus is simulated as a joystick.

According to an embodiment of the present invention, a touch sensitive processing method for simulating a stylus as a joystick is provided, which may include: maintaining a mode parameter to record an operating mode of the stylus; determining, by a touch panel, a position, an axial direction and a tilt angle of the stylus with respect to the touch panel; and when a mode parameter indicates a joystick mode, converting the axial direction and the tilt angle of the stylus into a first-axis tilt angle and a second-axis tilt angle and transmitting them to an application via a joystick driver, when the mode parameter indicates a stylus mode, transmitting the position to a touch sensitive driver, wherein the joystick driver, the touch sensitive driver, and the application all run under an operating system executed by a central processing unit (CPU) of a host.

According to an embodiment of the present invention, a control method for a stylus to be simulated as a joystick is provided, the stylus including a first end and a second end opposite to the first end, the control method including: sending a first electrical signal via the first end; and sending a second electrical signal via the second end, wherein the first electrical signal is different from the second electrical signal, such that a touch sensitive processing apparatus knows whether the first end or the second end of the stylus is touching a touch panel, when the first end is touching the touch panel, the stylus is simulated as a joystick.

Based on the touch sensitive electronic system, processing apparatus and method thereof, and the stylus and its control method provided in the present invention, the stylus can be simulated as a joystick, such that users only need one type of device to achieve multiple types of control methods and input experiences. In particular, a user may use a stylus that is touching a touch panel as a joystick.

DETAILED DESCRIPTION OF THE EMBODIMENTS

Figure 1:
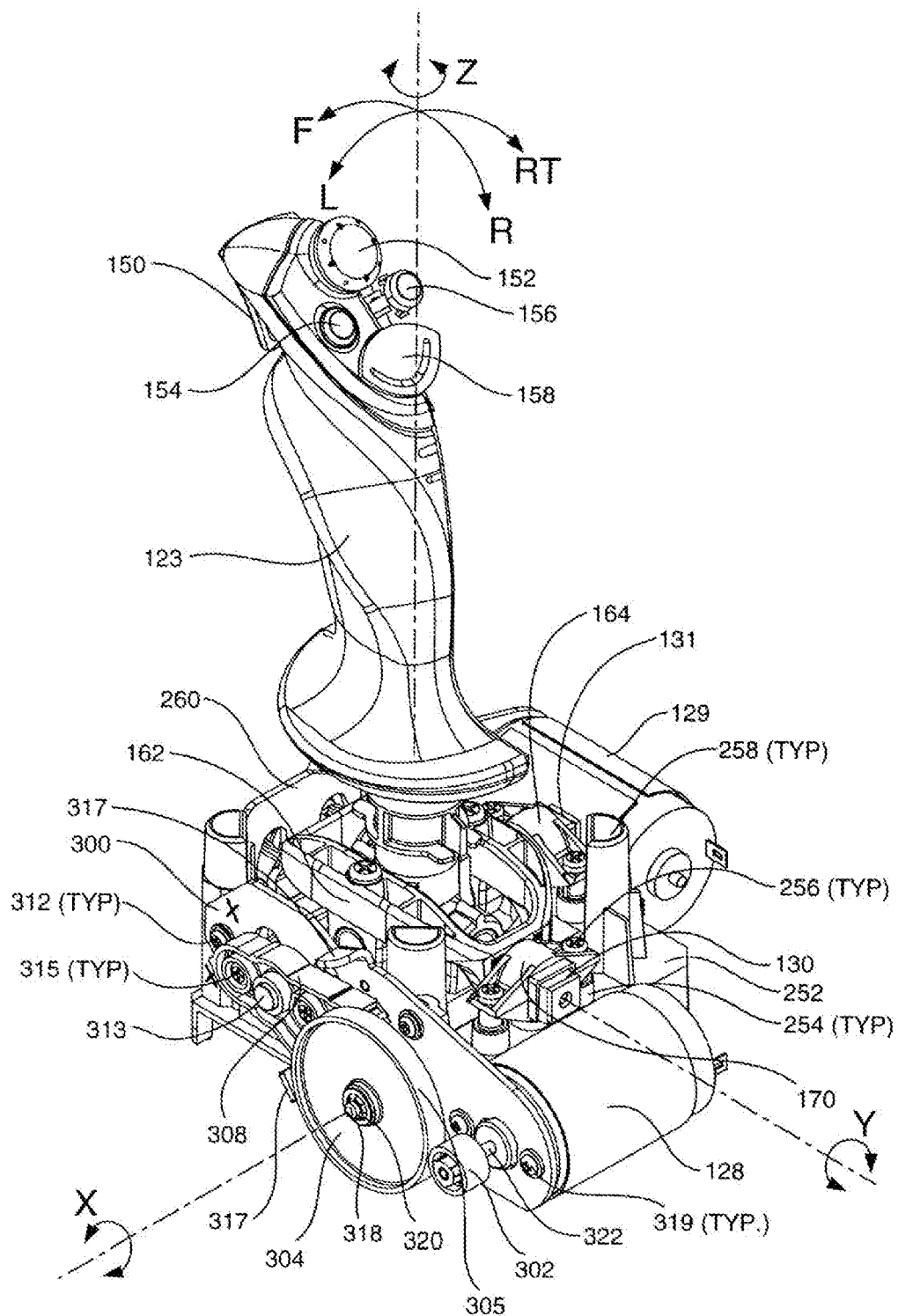
FIG. 1 is FIG. 7 of U.S. Pat. No. 6,429,849.

The present invention is described by the following specific embodiments. However, in addition to those embodiments disclosed herein, the present invention can be widely applied to other embodiments. The scope of the present invention is not limited by these embodiments, but rather those set forth in the claims. In order to facilitate a clear description and for those skilled in the art to readily understand the contents of the present invention, some portions of the diagrams are not drawn to scale; ratios of some elements with respect to other elements are exaggerated; and some details that are not relevant to the present invention are omitted for conciseness of the diagrams.

The present application is generally related to a touch sensitive system for determining a tilt angle and an axial direction of a stylus with respect to a touch panel in order for the stylus to be used as a joystick. Users are able to use the stylus that is touching the touch panel as a joystick. The touch sensitive system may use the tilt angle and the axial direction of the stylus as the tilt angle and the axial direction of the joystick.

The touch sensitive system of the present application essentially includes three components: a stylus, a touch panel and a touch sensitive processing apparatus connected to the touch panel. The touch panel can be a conventional touch pane or a touch screen. The touch sensitive processing apparatus may use the touch panel to determine the tilt angle and the axial direction of the stylus with respect to the touch panel, as well as the position of the stylus with respect to the touch panel. In addition to detecting the stylus, the touch sensitive system may also detect any external conductive objects that do not actively emit electrical signals, such as fingers or palms. However, the present application does not restrict the way in which the touch sensitive system determines the position, the tilt angle and the axial direction of the stylus above, and more than one mechanism can be used to detect the stylus and/or external conductive objects.

The touch sensitive processing apparatus can be implemented by software, hardware or a combination of both. It may include analog circuits, digital circuits and digital signal processors and/or embedded processors for executing firmware for calculating said position, tilt angle and axial direction. Since the touch sensitive processing apparatus needs to be connected to the touch panel and execute special functions in order to obtain the tilt angle, the axial direction and a spin angle of the stylus, the touch sensitive processing apparatus is not a generic computer for providing generic computer function. The touch sensitive processing apparatus may include an analog front-end (AFE) and a digital back-end. The AFE may include, but is not limited to, a specialized circuit, such as a multiplexer, an integrator or a signal amplifier. The digital back-end may include, but is not limited to a specialized circuit, such as a digital signal processor, an accumulator, a multiplier or a digital clock generator. In order to maintain a certain reporting rate of touch events, the touch sensitive processing apparatus has to include the above specialized circuits to increase the processing speed. This is not achievable with generic computers. As known to the present applicants, commercially available touch sensitive processing apparatuses are implemented not only with a generic computers. As for the stylus and the touch panel, it is also not possible to implement them with generic computers.

Figure 2A:
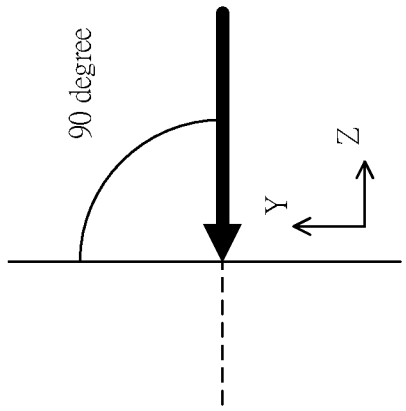
FIGS. 2A~2C are diagrams showing a tilt angle and an axial direction of a stylus with respect to a touch panel from three perspectives.
Figure 2B:
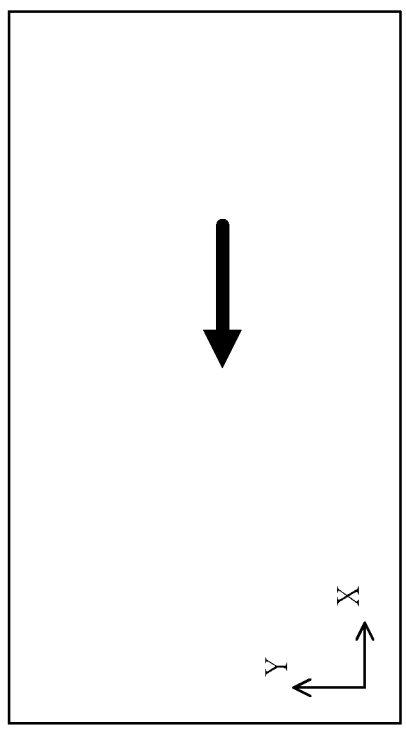
Figure 2C:
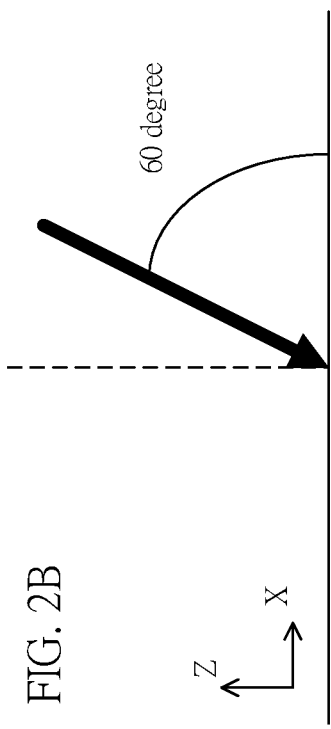

Referring to FIGS. 2A~2C, diagrams showing a tilt angle and an axial direction of a stylus with respect to a touch panel from three perspectives are shown. The touch panel can be regarded as the XY plane. The stylus is represented by a bold arrow sign, and the tip of the arrow indicates the tip of the stylus. FIG. 2A is a view looking from at the XY plane from the top. The axial direction of the stylus points towards the left of the XY plane, i.e. it is parallel to the X axis. The axial direction in the present application usually refers to the direction of the axis of the stylus body projected on the plane of the touch panel as shown in FIG. 2A.

FIG. 2B is a schematic diagram of the stylus projected on the XZ plane. It can be seen that the angle between the stylus on the XZ plane and the touch panel is 60 degrees. Therefore, the angle between the stylus and the Z axis is 30 degrees. As the axis of the stylus body is parallel to the X axis, the angle between the stylus and the touch panel is also 60 degrees. FIG. 2C is a schematic diagram of the stylus projected on the YZ plane. It can be seen that the angle between the stylus on the YZ plane and the touch panel is 90 degrees. Therefore, the angle between the stylus and the Z axis is 0 degree.

The tilt angle used in the present application may refer to the angle between the axis of the stylus body and the touch panel, or the angle between the axis of the stylus body and the Z axis. One with ordinary skill in the art may appreciate that one can be easily derived from the other.

It can be understood from the example shown in FIGS. 2A~2C that, when the touch sensitive system treats the stylus as a joystick such as that shown in FIG. 1, the 90-degree angle shown in FIG. 2C can be regarded as the angular displacement about the X axis; the 60-degree angle shown in FIG. 2B can be regarded as the angular displacement about the Y axis. Thus, when the touch sensitive system obtains the tilt angle of the stylus, it can calculate the angular displacements about the X and Y axes. Then, these two data are transmitted to an operating system or an application, such that the stylus can be simulated and manipulated as a joystick.

In an embodiment, the touch sensitive system can be connected to a joystick driver in the operating system. The angular displacements about the X and Y axes can be reported back to the joystick driver, which then reports these to an application subscribed to this software interrupt service. In another embodiment, the touch sensitive system can simulate a joystick driver, and report the angular displacements to an application subscribed to this software interrupt service.

In some embodiments, the joystick driver may provide more parameters, for example, the reporting frequency (e.g. number of reports per second), angular speeds derived from the angular displacements, joystick number, and the statues of various sensors on the joystick. The various sensors may include buttons, multi-level knobs, single-level knobs, pressure sensors, or even another mini joystick on the joystick. When corresponding sensors are provided on the stylus, the statues of these sensors as well as the battery power and/or a stylus code can be returned to the real or simulated joystick driver.

In the diagram of the conventional joystick of FIG. 1, an angular displacement about the Z axis can be determined. Corresponding to the stylus, this angular displacement can be regarded as the angular displacement of the stylus rotating about the stylus body itself. If the touch sensitive system detects an angular displacement of the stylus rotating about the stylus body, it can be regarded as an angular displacement about the Z axis of the conventional joystick.

In some embodiments, the tip of the stylus is equipped with a pressure sensor for sensing a pressure applied on the touch panel by the tip of the stylus. When corresponding to certain applications, this pressure value can be used as to correspond to the velocity of an object being manipulated. For example, the movements of a character in a computer game manipulated via a conventional joystick are controlled by the angular displacements about the X and Y axes. The stylus shown in FIGS. 2A~2C can be used to control a character moving towards the left or right of the screen. In some examples, the tilt angle can be used to control the speed at which the character is moving. For example, as the stylus gets nearer to the vertical axis, the speed decreases; else the speed increases. The pressure value can also be used to control the speed at which a character is moving. For example, as the pressure gets greater, the speed increases; and vice versa.

In some other embodiments, the tilt angle can be used to control the movement of the window. The stylus shown in FIGS. 2A~2C can be used to control the left or right scrolling of the window. The pressure value can also be used for adjusting the speed at which the window content scrolls, for example, for controlling how fast a document is scrolled. In another example, the pressure value can be used to adjust the zoom ratio of the window content. For example, the greater the pressure, the larger the zooming ratio; and vice versa. In an example, when the stylus is perpendicular to the touch panel, the pressure value is used for adjusting the zoom ratio of the window content. When the stylus is not perpendicular to the touch panel, the pressure value is used for adjusting the scrolling speed of the window content.

In another example, when the tilt angle of the stylus stays in a particular range for a period of time while the tip of the stylus is moving, all or part of the window content can be dragged. In this example, this function is activated only when the pressure value is above a certain threshold or when the axial direction remains in a particular range for a particular length of time.

The present application does not limit the way in which the stylus is connected to the touch sensitive processing apparatus. These two components can have a wired connection, for example, via a proprietary interface or an industrial interface, such as an USB interface. Alternatively, they can also be connected wirelessly, for example, via a proprietary interface or an industrial interface, such as a Bluetooth interface. Signals can also be emitted from the tip of the stylus. The touch sensitive processing apparatus then receives these signals via the touch panel. The touch sensitive processing apparatus may also emit signals via the touch panel, and the stylus receives these signals from its tip to achieve communications. These signals can be modulated in an analog or digital manner. In the embodiments described above, at least the statues of the sensors on the stylus can be transmitted to the touch sensitive processing apparatus.

In some embodiments, the stylus not only includes the sensors or input devices described above, but also output devices, such as sound, video and/or tactile output devices. For example, an application, via a driver, may ask the touch sensitive processing apparatus to instruct the stylus to make a sound, emit a light and/or vibrate in order to indicate a change in a certain status of the application.

The present application does not limit when the touch sensitive processing apparatus regards stylus-associated information as output messages associated with a joystick. In some embodiments, the touch sensitive processing apparatus will have a mode parameter corresponding to each stylus. The mode parameter may indicate whether the stylus is in a stylus mode or a joystick mode.

In an embodiment, a button or an input device can be included on the stylus. Users can switch the stylus between a joystick mode and a stylus mode via the button or the input device. In another embodiment, when a user touches the touch panel using a first end of the stylus, the stylus mode is chosen. On the other hand, when the user touches the touch panel using a second end of the stylus, the joystick mode is chosen. The first and second ends of the stylus may, for example, have different touch areas, shapes or directionality, such that the touch sensitive processing apparatus is able to identify which end of the stylus is touching the touch panel. In still another embodiment, the mode of the stylus can be set by software, such as through settings in an application or the operating system. In an embodiment, a button or an input device of an electronic apparatus using the stylus can be used to switch the stylus between the stylus and the joystick modes.

In an embodiment, the tip or the first end of the stylus includes a pressure sensing element. The stylus itself may include a pressure calculating device for measuring how much pressure is experienced by this pressure sensing element. Then, the pressure calculating device transmits the measured pressure value to the touch sensitive processing apparatus. For example, the pressure value is modulated and sent as an electrical signal via the tip of the stylus, and then the touch sensitive processing apparatus demodulates the electrical signal sensed by the touch panel into the pressure value. Alternatively, the pressure value can be transmitted to the touch sensitive processing apparatus through a wired or wireless communication protocol. The stylus may alternatively not include the pressure calculating device for measuring how much pressure is experienced by the pressure sensing element, but rather use a non-active component to modulate the pressure value into an electrical signal for transmission. The touch sensitive processing apparatus then demodulates the electrical signal sensed by the touch panel back into the pressure value. Alternatively, the touch panel or the touch sensitive processing apparatus includes a pressure sensing function that can sense the pressure between the stylus and the touch panel directly, thereby eliminating the need for a pressure sensing element on the stylus or transmitting any pressure-associated signals. Regardless how the pressure value is obtained, when the touch sensitive processing apparatus detects that the pressure value exceeds a certain threshold, the stylus is switched to the joystick mode.

In an embodiment, the first end of the stylus includes a mechanical structure, such as a tenon or a switch. When under a pressure that exceeds a certain threshold, the mechanical structure is then fixed at an activated status or a second status. When under a pressure that exceeds the same or another threshold, the mechanical structure returns to a relaxed status or a first status. The stylus may transmit the status of the mechanical structure to the touch sensitive processing apparatus in any form. The touch sensitive processing apparatus can then switch the stylus to the joystick mode or the stylus mode according to the status of the mechanical structure.

In an embodiment, the mechanical structure can be a button with a function similar to a button on a mouse. If the mechanical structure records a single action, it can be regarded as one click. If the mechanical structure records two consecutive actions, it can be regarded as double clicks. When the mechanical structure is pressed down and not released, then it records a pressed action. The stylus may transmit the status of the mechanical structure to the touch sensitive processing apparatus in any form. The touch sensitive processing apparatus can then switch the stylus to the joystick mode or the stylus mode according to the status of the mechanical structure. For example, a single click or a double click can be used for switching between the joystick and the stylus modes. Alternatively, the mechanical structure can be pressed down for a period of time for switching between the joystick and the stylus modes.

In an embodiment, a specific area of the touch panel can be set as the joystick area. When the tip of the stylus enters the joystick area, the touch sensitive processing apparatus may set the stylus in the joystick mode. When the tip of the stylus leaves the joystick area, the touch sensitive processing apparatus may then return the stylus back to the stylus mode. In another embodiment, the range of the joystick area can be controlled by the operating system or an application. In yet another embedment, the touch panel may include a plurality of joystick areas. Each joystick area may accommodate a particular stylus.

One difference between a stylus and a joystick is that the position of the stylus on the touch panel is not fixed. On the other hand, the joystick will have a fixed pivot. Therefore, it would be more difficult for users to use the stylus as a joystick. In some situations, the joystick mode of the stylus is limited to one dimensional output only. For example, the angular displacement of the stylus about the X axis is ignored and only the angular displacement about the Y axis is outputted, or the angular displacement of the stylus about the Y axis is ignored, only the angular displacement about the X axis is outputted. Alternatively, the angular displacements about the X and Y axes are combined into a rotating vector as an output. These methods aim to reduce the difficulty in simulating a joystick. For example, when simulating a flying game, a left stylus is used as a throttle for rotating back and forth only and a right stylus as a control stick for two-dimensional (2D) rotating. As another example, when simulating a tank-driving game, left and right styli may be used to control the left and right tracks, respectively, wherein the two simulation joysticks can only roll back and forth.

In the touch sensitive system provided by the present application, users can use the stylus to manipulate 3D object models in an application, such as 3D object models in a computer-aided design application, models in 3D printing application, or the like.

Figure 3:
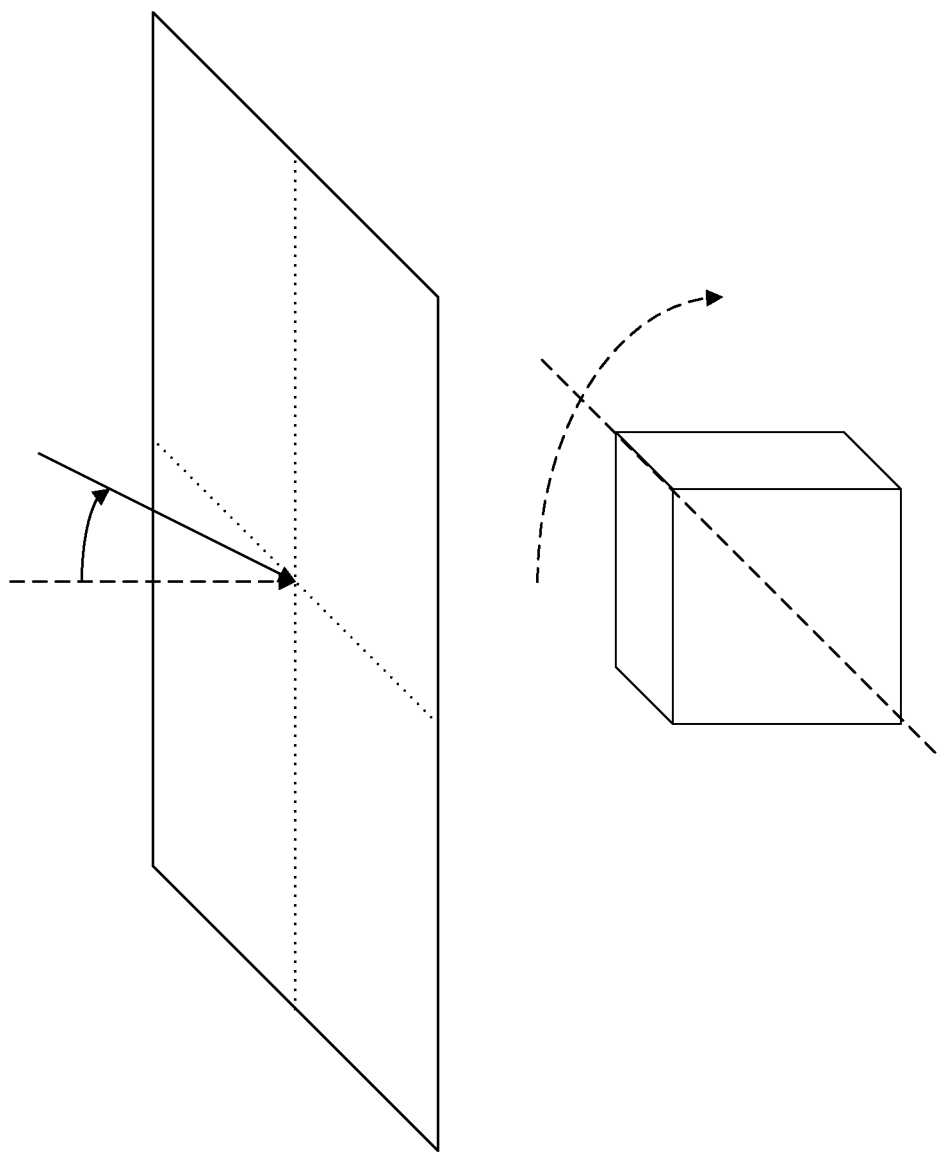
FIG. 3 is a schematic diagram depicting rotating of a 3D object model controlled by a stylus under a joystick mode in accordance with an embodiment of the present invention.

In an embodiment, a user can first associate a particular object or a collection of objects using a cursor or a pointer in the stylus mode. After associating the particular object or collection of objects, he/she can control the axial direction of the stylus under the joystick mode in order to control the rotating directions of the object(s). As an example, as shown in FIG. 3, when the user tilts the stylus to the right, the axial direction of the stylus tip points to the left of the touch panel, and the associated object(s) rolls to the right. Similarly, when the user tilts the stylus upwards, the axial direction of the stylus tip points to the bottom of the touch panel, and the associated object(s) rolls downwards.

Figure 4:
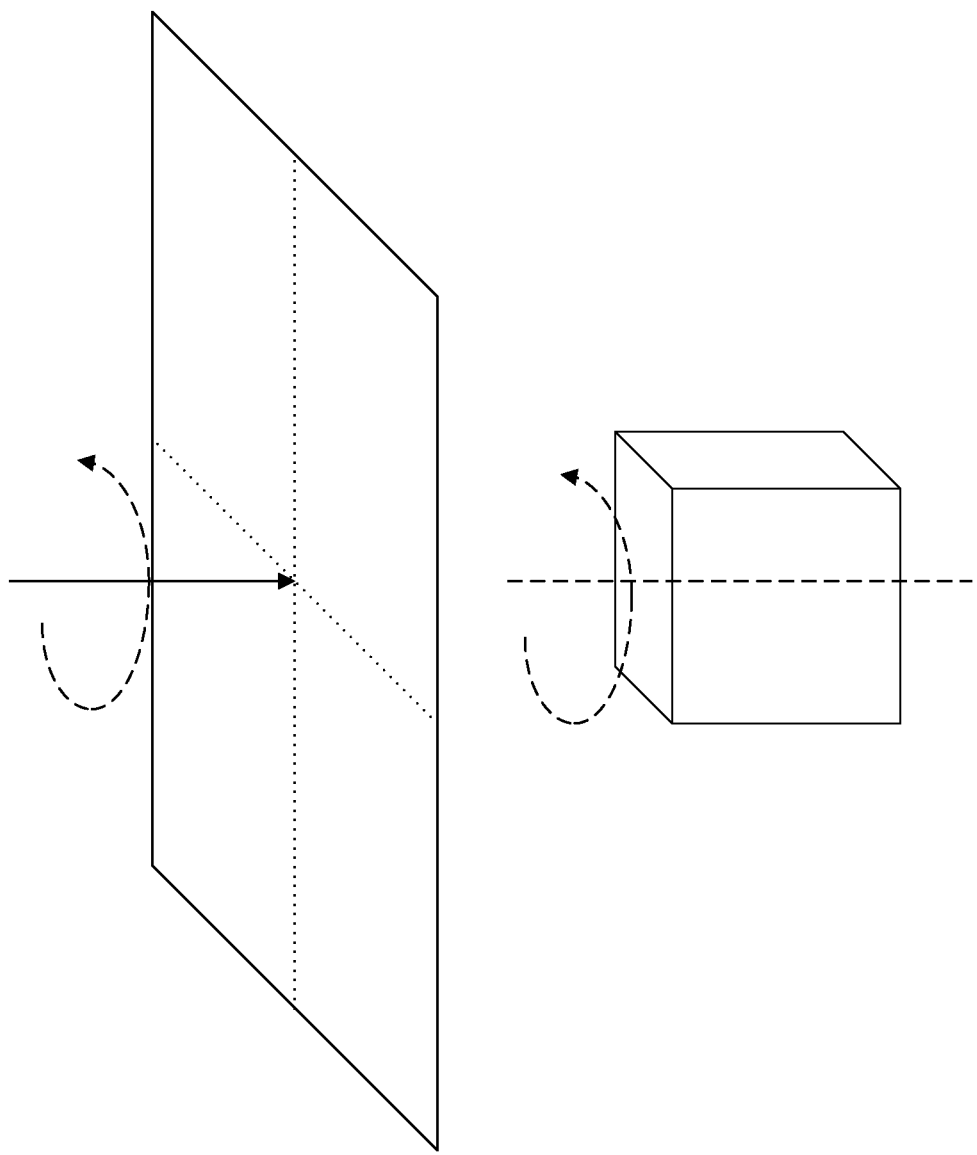
FIG. 4 is a schematic diagram depicting rotating of a 3D object model controlled by a stylus under a joystick mode in accordance with an embodiment of the present invention.

As shown in FIG. 4, when the user rotates the stylus around the axis of the stylus body, the associated object(s) will also rotate about a particular axis. In the embodiment of FIG. 4, the axis of the stylus body is the Z axis perpendicular to the XY plane (plane of the touch panel).

Figure 5:
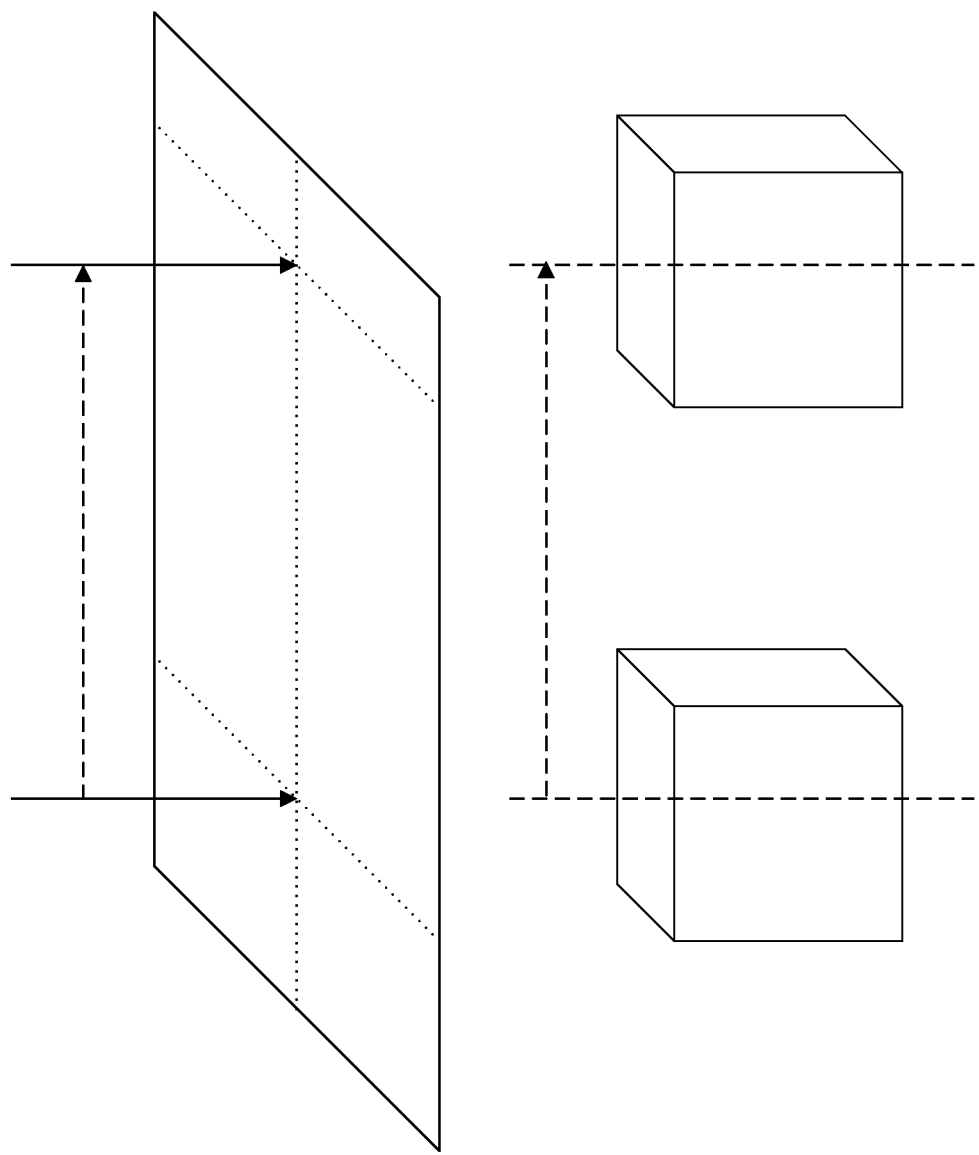
FIG. 5 is a schematic diagram depicting moving of a 3D object model controlled by a stylus under a joystick mode in accordance with an embodiment of the present invention.

As shown in FIG. 5, an associated object can be dragged under the stylus mode or the joystick mode. A user may also drag an associated object using a pressed action of the stylus tip or of a particular button on the stylus.

The embodiment of FIG. 3 demonstrates the controlling of rotations of a 3D object model about a first axis and a second axis. The embodiment of FIG. 4 demonstrates the controlling of rotations of the 3D object model about a third axis. Therefore, a user can control 3D rotations of a 3D object model through the joystick mode. An embodiment of FIG. 5 further demonstrates moving a 3D object model in a three-dimensional space, thereby controlling 3-axis rotations and 3-axis movements of the object.

Figure 6:
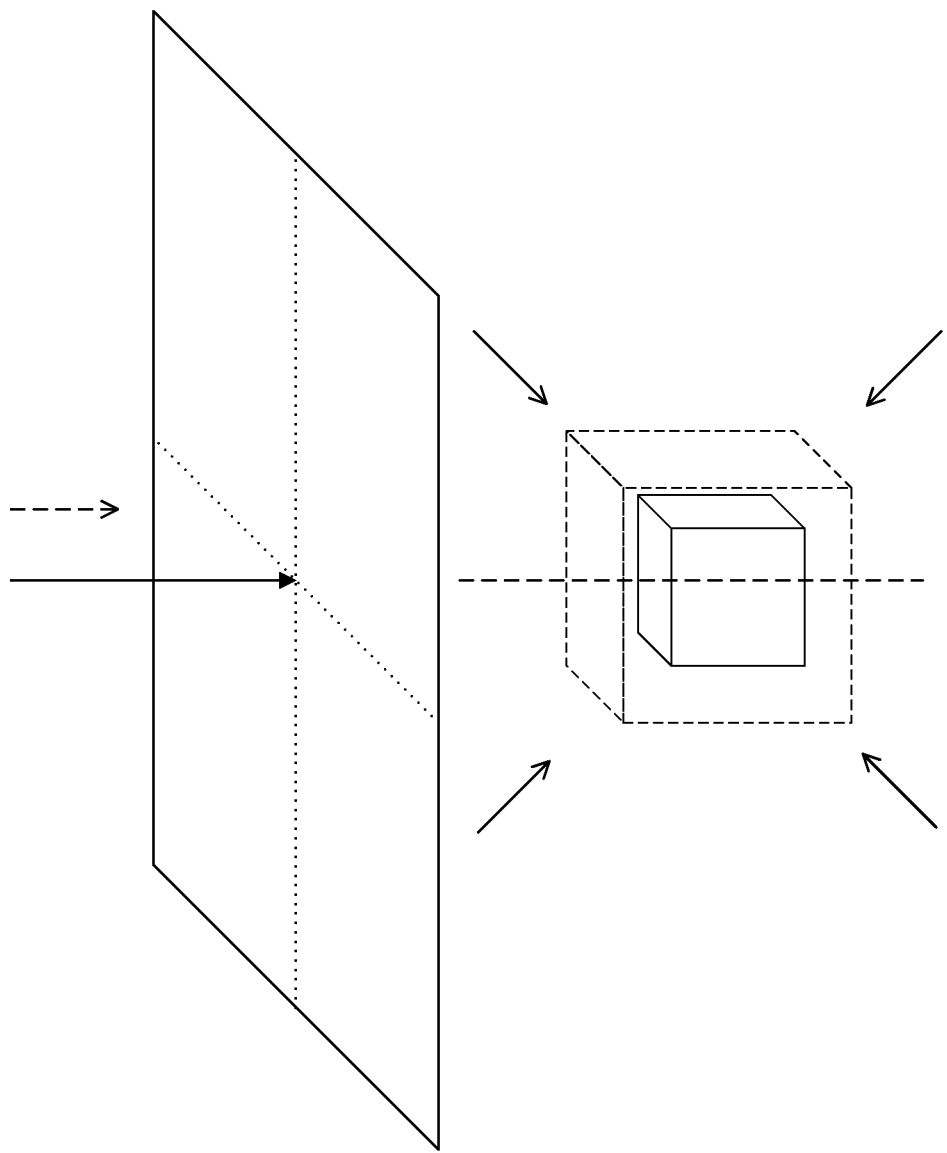
FIG. 6 is a schematic diagram depicting zooming or perspective zooming of a 3D object model controlled by a stylus under a joystick mode in accordance with an embodiment of the present invention.

In addition, as shown in FIG. 6, by controlling the pressure applied to the tip of the stylus, the user can perform one or a combination of the following actions: zooming in/out on/from an object, controlling the distance for viewing an object, and controlling the viewing angle of an object.

More details on how a touch sensitive system determines a tilt angle and an axial direction of a stylus with respect to a touch panel can be found in U.S. patent application Ser. Nos. 10/513,6061, 10/610,7665 and 10/514,4061, claiming priorities to provisional U.S. patent applications 62/251,205, 62/334,668 and 62/338,671, respectively.

In an embodiment of the present invention, the stylus includes a plurality of electrodes for transmitting electrical signals. These electrical signals can be modulated in terms of time, frequency, or strength thereof, so that the touch sensitive processing apparatus is capable of obtaining information, such as the position, the axial direction, and the spin angle of the stylus with respect to the touch panel, the pressure experienced at the tip of the stylus and/or statuses of various sensors on the stylus. In this embodiment, the touch sensitive processing apparatus may also detect external conductive objects that do not actively transmit electrical signals via the touch panel using self-capacitive and/or mutual-capacitive detection methods.

Figure 7:
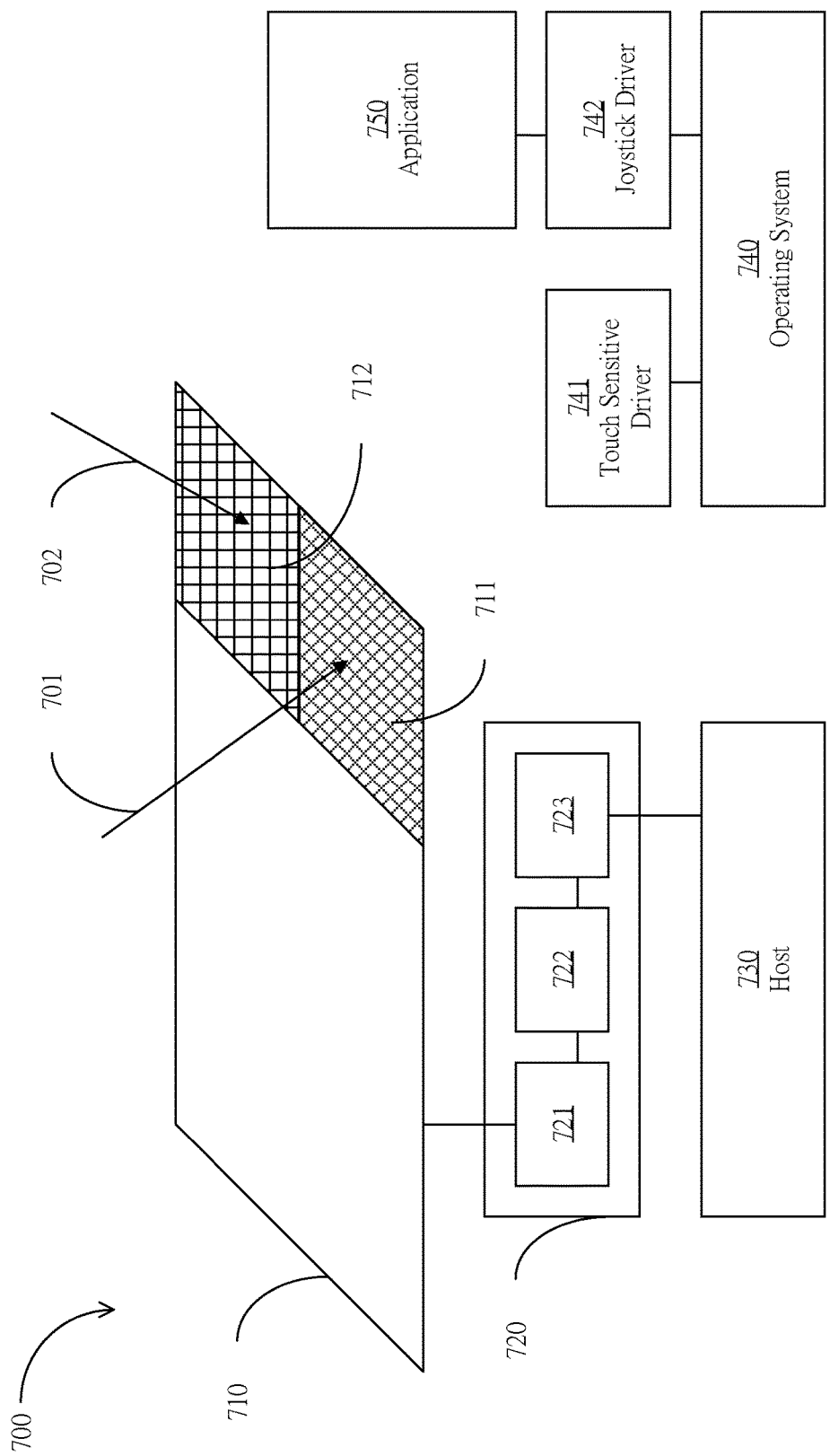
FIG. 7 is a block diagram depicting an electronic system in accordance with an embodiment of the present invention.

Referring to FIG. 7, a block diagram depicting an electronic system 700 in accordance with an embodiment of the present invention is shown. The electronic system 700 includes a touch sensitive sub-system, which includes a first stylus 701, a second stylus 702, a touch panel 710 and a touch sensitive processing apparatus 720. The touch sensitive processing apparatus 720 is connected to a host 730. The host 730 includes at least a central processing unit (CPU) and a memory for executing an operating system 740 to control the electronic system 700, a touch sensitive driver 741 and a joystick driver 742 that run under this operating system environment, and an application 750 that subscribes to the joystick driver 742. The present invention does not limit how the touch sensitive processing apparatus 720 is connected with the host 730. For example, an industrial interface (e.g. UART, USB, PCI-I, SATA etc.) or a proprietary interface can be used for connecting between the touch sensitive processing apparatus 720 and the host 730. The host 730 may be the x86 or x64 architecture by Intel, the ARM architecture by ARM Holdings plc., or other computer architectures. The operating system 740 can be a Windows operating system, an operating system in the UNIX family, or other types of operating systems.

The touch sensitive processing apparatus 720 may further include a touch panel interface 721 and a host interface 723 for connecting with the touch panel 710 and the CPU, respectively. The touch sensitive processing apparatus 720 may further include a microprocessor 722 for connecting to the touch panel interface 721 and the host interface 723 for detecting, via the touch panel 710, positions, axial directions and tilt angles of the first stylus 701 and the second stylus 702 with respect to the touch panel 710. The touch sensitive processing apparatus 720 maintains a mode parameter for each of the styli 701 and 702 for recording the operating mode of the respective styli. For example, a first mode parameter and a second mode parameter record the operating mode of the first stylus 701 and the second stylus 702, respectively. When the first mode parameter indicates a joystick mode, the touch sensitive processing apparatus 720 converts the axial direction and the tilt angle of the first stylus 701 into a first-axis tilt angle and a second-axis tilt angle, and transmitting the first-axis and second-axis tilt angles to the application 750 via the joystick driver 742. On the other hand, when the first mode parameter indicates a stylus mode, the touch sensitive processing apparatus 720 transmits the position to the touch sensitive driver 741.

In order to change the operating mode of the stylus, in an embodiment, when the position of the first stylus 701 is inside a first joystick area 711 of the touch panel 710, the touch sensitive processing apparatus 720 sets the first mode parameter to be the joystick mode. When the touch panel 710 is not inside the first joystick area 711, the touch sensitive processing apparatus 720 sets the first mode parameter to be the stylus mode.

In order to change the operating mode of the stylus, in an embodiment, the first stylus 701 includes an input device for allowing a user to set the first mode parameter via the input device. The first stylus 701 then transmits the status of the input device to the touch sensitive processing apparatus 720. In an example, in order to allow the user to easily switch between the operating modes, the input device includes a mechanical structure at a first end of the first stylus 701. When the mechanical structure is under a pressure greater than a first threshold, it is deformed into a first status. When it is under another pressure greater than a second threshold, the mechanical structure is deformed into a second status. The first status corresponds to the joystick mode, and the second status corresponds to the stylus mode. The first end can be the tip of the stylus, or an end that is opposite to the tip of the stylus. In another example, in order to allow the user to easily switch between the operating modes, the input device further includes a button on the first stylus 701. When the button detects a touch event, the first stylus 701 then sends the status of the input device to the touch sensitive processing apparatus 720, wherein the touch event includes one of the following events: a single click; a double click; and a long press.

In order to change the operating mode of the stylus, in an embodiment, when a first end of the first stylus 701 is touching the touch panel 710, the touch sensitive processing apparatus 720 sets the first mode parameter to the joystick mode; and when a second end of the first stylus 701 is touching the touch panel 710, the touch sensitive processing apparatus 720 sets the first mode parameter to the stylus mode. As such, a user can easily know whether or not the first stylus 701 is in the joystick mode. In an example, in order to facilitate the touch sensitive processing apparatus 720 in identifying the mode setting of the first stylus 701, the first end and the second end of the first stylus 701 are provided with different touch sensitive areas, shapes or directionalities, such that the touch sensitive processing apparatus 720 can easily determine whether the first end or the second end of the first stylus 701 is touching the touch panel 710. In an example, in order to facilitate the touch sensitive processing apparatus 720 in identifying the mode setting of the first stylus 701, the first end and the second end of the first stylus 701 emit different electrical signals, such that the touch sensitive processing apparatus 720 can easily determine whether the first end or the second end of the first stylus 701 is touching the touch panel 710.

In order to change the operating mode of the stylus, in an embodiment, the CPU is further used for executing a setup program under the environment of the operating system 740. The setup program is used for receiving an input from the user in order to set the first or second mode parameter in the touch sensitive processing apparatus 720. The input herein refers to an input device, such as a keyboard, a mouse or a touch panel.

In order to enhance user experience during simulation of the stylus as a joystick, in an embodiment, the second-axis tilt angle is a fixed value, so the application 750 only receives changes in the first-axis tilt angle, that is, the manipulation of the first stylus 701 affects only the first axis, but not the second axis.

In order to simulate the environment of multiple joysticks being used, the electronic system 700 further includes the second stylus 702. The touch sensitive processing apparatus 720 maintains the second mode parameter to record the operating mode of the second stylus 702. When the second mode parameter indicates the joystick mode, the touch sensitive processing apparatus 720 converts the axial direction and the tilt angle of the second stylus 702 into a first-axis second tilt angle and a second-axis second tilt angle, and transmitting the first-axis and second-axis second tilt angles to the application 750 via the joystick driver 742. On the other hand, when the first mode parameter indicates a stylus mode, the touch sensitive processing apparatus 720 transmits the position to the touch sensitive driver 741.

In order to enhance user experience on simulation of multiple styli as multiple joysticks, in an embodiment, the second-axis tilt angle is a fixed value, and the first-axis second tilt angle is also the fixed value, so the application 750 only receives changes in the first-axis tilt angle of the first stylus 701, that is, the manipulation of the first stylus 701 affects only the first axis, but not the second axis, and the application 750 only receives changes in the second-axis tilt angle of the second stylus 702, that is, the manipulation of the second stylus 702 affects only the second axis, but not the first axis.

In order to enhance user experience on simulation of multiple styli as multiple joysticks, when the position of the second stylus 702 is in a second joystick area 712 of the touch panel 710, the touch sensitive processing apparatus 720 sets the second mode parameter to be the joystick mode. When the position of the second stylus 702 is not in the second joystick area 712 of the touch panel 710, the touch sensitive processing apparatus 720 sets the second mode parameter to be the stylus mode. The second joystick area 712 is different from the first joystick area 710.

In order to enhance user experience during simulation of the stylus as a joystick by allowing the user to add another control factor, the touch sensitive processing apparatus 720 detects, via the touch panel 710, a spin angle of the first stylus 701 with respect to the touch panel 710. When the first mode parameters indicates the joystick mode, the touch sensitive processing apparatus 720 transmits the spin angle to the application 750 via the joystick driver 742.

Figure 8:
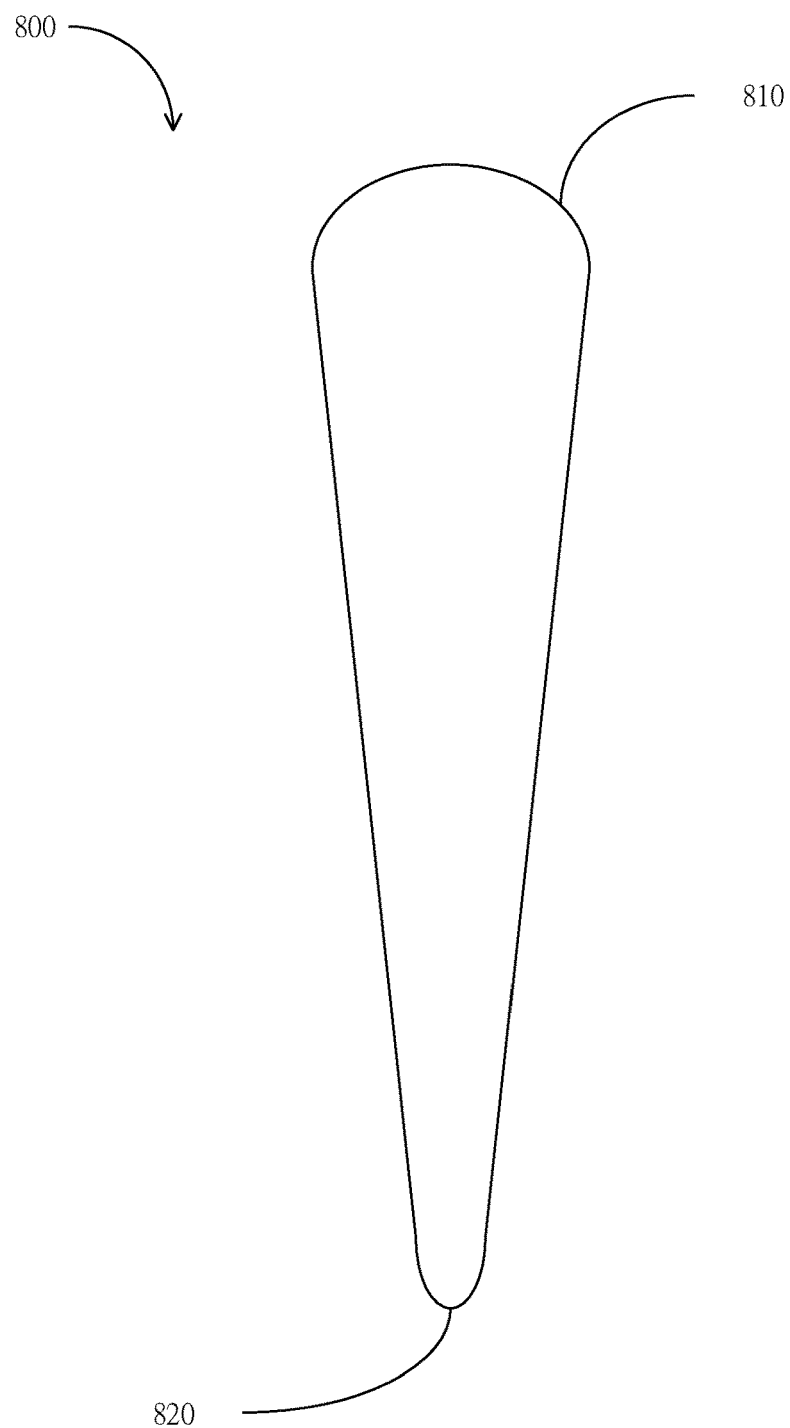
FIG. 8 is a schematic diagram depicting the appearance of a stylus in accordance with an embodiment of the present invention.

Referring to FIG. 8, a schematic diagram depicting the appearance of a stylus in accordance with an embodiment of the present invention is shown. A stylus 800 can be the first stylus 701 or the second stylus 702 shown in FIG. 7. The stylus 800 includes a first end 810 and a second end 820 opposite to the first end 810. Between the two ends is the stylus barrel. The first end 810 and the second end 820 are provided with different touch sensitive areas, shapes or directionalities, such that a touch sensitive processing apparatus is able to determine whether the first end 810 or the second end 820 of the stylus 800 is touching a touch panel. When the first end 810 is touching the touch panel, the stylus 800 is simulated as a joystick.

In another embodiment, the first end 810 and the second end 820 of the stylus 800 emit different electrical signals, such that a touch sensitive processing apparatus is able to determine whether the first end 810 or the second end 820 of the stylus 800 is touching a touch panel. When the first end 810 is touching the touch panel, the stylus 800 is simulated as a joystick.

Figure 9:
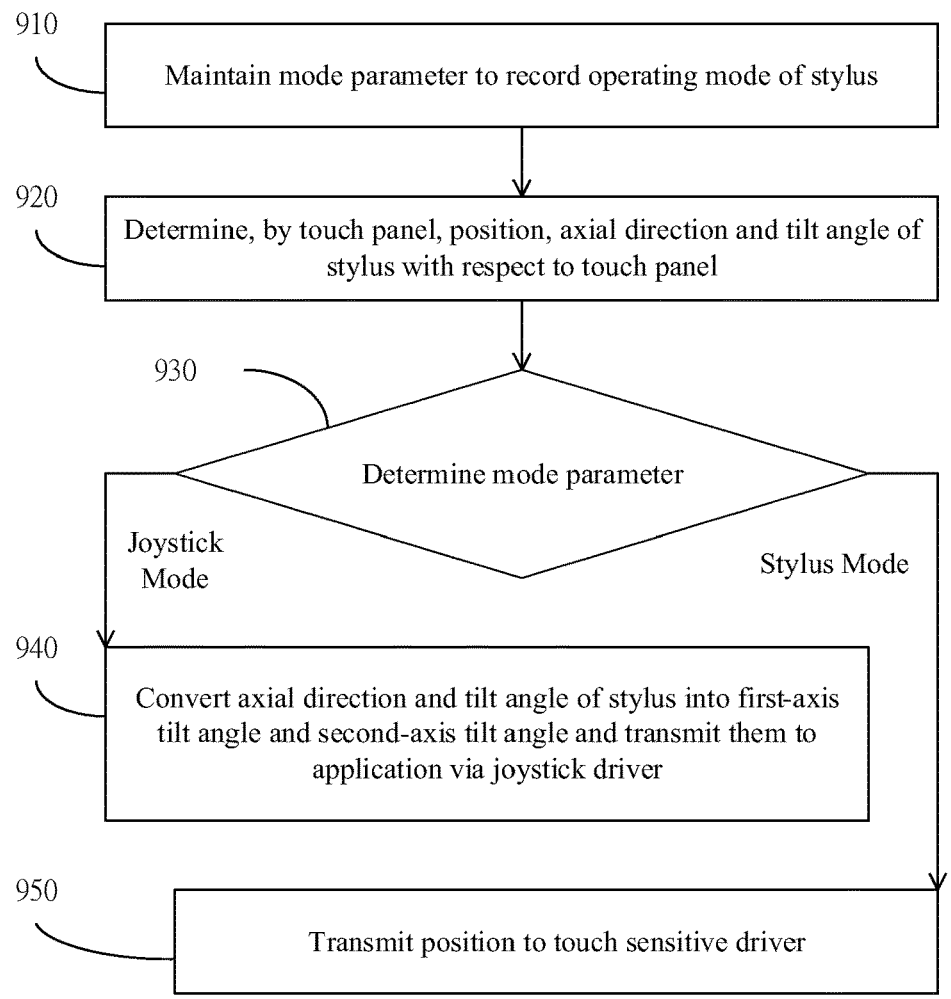
FIG. 9 is a flowchart illustrating a touch sensitive processing method in accordance with an embodiment of the present invention.

Referring to FIG. 9, a flowchart illustrating a touch sensitive processing method in accordance with an embodiment of the present invention is shown. The touch sensitive processing method is applicable to the touch sensitive processing apparatus 720 in FIG. 7. In an embodiment, it is applicable to the microprocessor 722 of the touch sensitive processing apparatus 720. For example, the touch sensitive processing method can be implemented in a software or a firmware, and executed by the microprocessor 722. The present invention permits additional steps to be added between the steps described herein. If no cause-and-effect is specifically stated, the present invention does not limit the order in which the steps are executed.

Step 910: Maintain a mode parameter to record an operating mode of a stylus.

Step 920: Determine, by a touch panel, a position, an axial direction and a tilt angle of the stylus with respect to the touch panel.

Step 930: Determine the mode parameter. When the mode parameter indicates a joystick mode, execute step 940. When the mode parameter indicates a stylus mode, execute step 950.

Step 940: Convert the axial direction and the tilt angle of the stylus into a first-axis tilt angle and a second-axis tilt angle and transmit them to an application via a joystick driver.

Step 950: Transmit the position to a touch sensitive driver.

In the method above, the joystick driver, the touch sensitive driver and the application are all executed under an operating system run by a CPU of a host.

In order to change the operating mode of the stylus, in an embodiment, the touch sensitive processing method further includes: when the position of the stylus is in a joystick area of the touch panel, the mode parameter is set to be the joystick mode; and when the position of the stylus is not in the joystick area, the mode parameter is set to be the stylus mode. In order to allow the user to easily switch between the operating modes, in an example, the stylus includes an input device for allowing a user to set the mode parameter via the input device. The touch sensitive processing method further includes: receiving a status of the input device from the stylus; and setting the mode parameter based on the status of the input device. In an example, in order to allow the user to easily switch between the operating modes, the input device further includes a button on the stylus. The touch sensitive processing method further includes: when the button detects a touch event, receiving the touch event from the stylus; and setting the mode parameter based on the touch event, wherein the touch event includes one of the following events: a single click; a double click; and a long press.

In order to change the operating mode of the stylus, in an embodiment, the touch sensitive method further includes: when a first end of the stylus is touching the touch panel, setting the mode parameter to the joystick mode; and when a second end of the stylus is touching the touch panel, setting the mode parameter to the stylus mode. As such, a user can easily know whether or not the stylus is in the joystick mode. In an example, in order to facilitate the touch sensitive processing apparatus in identifying the mode setting of the stylus, the touch sensitive method further includes: determining whether the first end or the second end of the stylus is touching the touch panel based on different touch sensitive areas, shapes or directionalities of the first end and the second end of the stylus. In another example, in order to facilitate the touch sensitive processing apparatus in identifying the mode setting of the stylus, the touch sensitive method further includes: determining whether the first end or the second end of the stylus is touching the touch panel based on different electrical signals emitted by the first end and the second end of the stylus.

In order to change the operating mode of the stylus, in an embodiment, the touch sensitive method further includes: receiving a user input from a setup program under the operating system environment in order to set the mode parameter.

In order to enhance user experience during simulation of the stylus as a joystick, in an embodiment, the touch sensitive method further includes: setting the second-axis tilt angle to be a fixed value.

In order to enhance user experience during simulation of the stylus as a joystick by allowing the user to add another control factor, the touch sensitive processing method further includes: detecting, via the touch panel, a spin angle of the stylus with respect to the touch panel; and when the mode parameters indicates the joystick mode, transmitting the spin angle to the application via the joystick driver.

Figure 10:
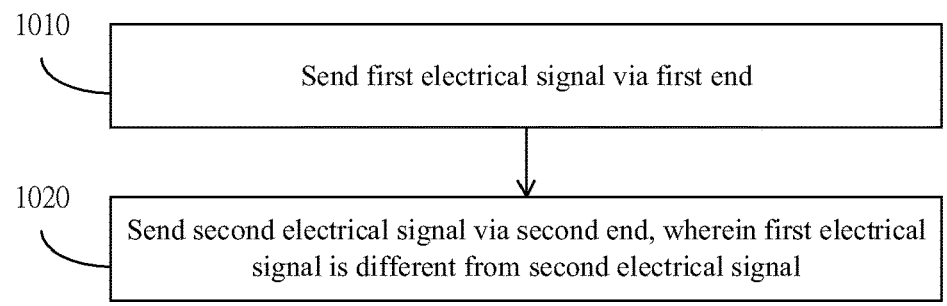
FIG. 10 is a flowchart illustrating a control method for a stylus in accordance with an embodiment of the present invention.

Referring to FIG. 10, a flowchart illustrating a control method for a stylus in accordance with an embodiment of the present invention is shown. The control method of FIG. 10 is applicable to the stylus 800 of FIG. 8. The present invention permits additional steps to be added between the steps described herein. If no cause-and-effect is specifically stated, the present invention does not limit the order in which the steps are executed. Step 1010: Send a first electrical signal via the first end 810. Step 1020: Send a second electrical signal via the second end 820, wherein the first electrical signal is different from the second electrical signal, such that a touch sensitive processing apparatus is able to determine whether the first end or the second end of the stylus is touching a touch panel. When the first end is touching the touch panel, the stylus is simulated as a joystick.

Based on the touch sensitive electronic system, processing apparatus and method thereof, and the stylus and its control method provided in the present invention, the stylus can be simulated as a joystick, such that users only need one type of device to achieve multiple types of control methods and input experiences. In particular, a user may use a stylus that is touching a touch panel as a joystick.

What is claimed is:

1. An electronic system for simulating a stylus as a joystick comprising:
   a host including a memory and a central processing unit (CPU) connected with the memory, the CPU being configured for executing an operating system, a joystick driver and a touch sensitive driver run under the operating system, and an application connected to the joystick driver;
   the stylus;
   a touch panel; and
   a touch sensitive processing apparatus connected with the touch panel and the CPU for determining, via the touch panel, a position, an axial direction and a tilt angle of the stylus with respect to the touch panel, wherein the touch sensitive processing apparatus maintains a mode parameter to record an operating mode of the stylus, when the mode parameter indicates a joystick mode, the touch sensitive processing apparatus converts the axial direction and the tilt angle of the stylus into a first-axis tilt angle and a second-axis tilt angle, and transmits the first-axis and second-axis tilt angles to the application via the joystick driver, when the mode parameter indicates a stylus mode, the touch sensitive processing apparatus transmits the position to the touch sensitive driver,
   wherein when the position of the stylus is in a joystick area of the touch panel, the touch sensitive processing apparatus sets the mode parameter to be the joystick mode, when the position of the stylus is not in the joystick area, the touch sensitive processing apparatus sets the mode parameter to be the stylus mode.

2. The electronic system of claim 1, wherein the input device further includes a button on the stylus, when the button detects a touch event, the stylus transmits a status of the input device to the touch sensitive processing apparatus, wherein the touch event includes one of the following events:
   a single click;
   a double click; and
   a long press.

3. The electronic system of claim 1, wherein the CPU is further configured for executing a setup program under the operating system environment, the setup program is configured for receiving an input from a user to set the mode parameter in the touch sensitive processing apparatus.

4. The electronic system of claim 1, wherein the touch sensitive processing apparatus is further configured for receiving a pressure value between the stylus and the touch panel, when the pressure value is greater than a threshold, the touch sensitive processing apparatus sets the mode parameter to the joystick mode, when the pressure value is less than the threshold, the touch sensitive processing apparatus sets the mode parameter to the stylus mode.

5. The electronic system of claim 1, wherein the second-axis tilt angle is a fixed value.

6. The electronic system of claim 1 further comprising a second stylus, wherein the touch sensitive processing apparatus maintains a second mode parameter to record an operating mode of the second stylus, when the second mode parameter indicates the joystick mode, the touch sensitive processing apparatus converts an axial direction and a tilt angle of the second stylus with respect to the touch panel into a first-axis second tilt angle and a second-axis second tilt angle, and transmits the first-axis and second-axis second tilt angles to the application via the joystick driver, when the mode parameter indicates the stylus mode, the touch sensitive processing apparatus transmits the position to the touch sensitive driver.

7. The electronic system of claim 6, wherein the second-axis tilt angle is a fixed value, and the first-axis second tilt angle is the fixed value.

8. The electronic system of claim 6, wherein when the position of the second stylus is in a second joystick area of the touch panel, the touch sensitive processing apparatus sets the second mode parameter to be the joystick mode, when the position of the second stylus is not in the second joystick area, the touch sensitive processing apparatus sets the second mode parameter to be the stylus mode, wherein the second joystick area is not the same as the first joystick area.

9. The electronic system of claim 1, wherein the touch sensitive processing apparatus further detects a spin angle of the stylus with respect to the touch panel, when the mode parameter indicates the joystick mode, the touch sensitive processing apparatus transmits the spin angle to the application via the joystick driver.

10. A touch sensitive processing apparatus for simulating a stylus as a joystick comprising:

a touch panel interface connected with electrodes of a touch panel;

a host interface connected with a central processing unit (CPU) of a host, the CPU being configured for executing an operating system, a joystick driver and a touch sensitive driver run under the operating system, and an application connected to the joystick driver; and a microprocessor connected with the touch panel interface and the host interface for determining, via the touch panel, a position, an axial direction and a tilt angle of a stylus with respect to the touch panel, wherein the microprocessor maintains a mode parameter to record an operating mode of the stylus, when the mode parameter indicates a joystick mode, the microprocessor converts the axial direction and the tilt angle of the stylus into a first-axis tilt angle and a second-axis tilt angle, and transmits the first-axis and second-axis tilt angles to the application via the joystick driver, when the mode parameter indicates a stylus mode, the microprocessor transmits the position to the touch sensitive driver, wherein when the position of the stylus is in a joystick area of the touch panel, the touch sensitive processing apparatus sets the mode parameter to be the joystick mode, when the position of the stylus is not in the joystick area, the touch sensitive processing apparatus sets the mode parameter to be the stylus mode.

11. The touch sensitive processing apparatus of claim 10, wherein the CPU is further configured for executing a setup program under the operating system environment, the setup program is configured for receiving an input from a user to set the mode parameter in the touch sensitive processing apparatus.

12. The touch sensitive processing apparatus of claim 10, wherein the touch sensitive processing apparatus is further configured for receiving a pressure value between the stylus and the touch panel, when the pressure value is greater than a threshold, the touch sensitive processing apparatus sets the mode parameter as the joystick mode, when the pressure value is less than the threshold, the touch sensitive processing apparatus sets the mode parameter as the stylus mode.

13. The touch sensitive processing apparatus of claim 10, wherein the second-axis tilt angle is a fixed value.

14. The touch sensitive processing apparatus of claim 10, wherein the touch sensitive processing apparatus is further configured for detecting, via the touch panel, a spin angle of the stylus with respect to the touch panel, when the mode parameter indicates the joystick mode, the touch sensitive processing apparatus transmits the spin angle to the application via the joystick driver.

15. A touch sensitive processing method for simulating a stylus as a joystick comprising:

maintaining a mode parameter to record an operating mode of the stylus;

determining, by a touch panel, a position, an axial direction and a tilt angle of the stylus with respect to the touch panel; and when a mode parameter indicates a joystick mode, converting the axial direction and the tilt angle of the stylus into a first-axis tilt angle and a second-axis tilt angle and transmitting them to an application via a joystick driver, when the mode parameter indicates a stylus mode, transmitting the position to a touch sensitive driver, wherein the joystick driver, the touch sensitive driver, and the application all run under an operating system executed by a central processing unit (CPU) of a host, when the position of the stylus is in a joystick area of the touch panel, setting the mode parameter to the joystick mode; and when the position of the stylus is not in the joystick area, setting the mode parameter to the stylus mode.

16. The touch sensitive processing method of claim 15, further comprising:

receiving a user input from a setup program under an operating system environment to set the mode parameter.

17. The touch sensitive processing method of claim 15, further comprising:

receiving a pressure value between the stylus and the touch panel;

when the pressure value is greater than a threshold, setting the mode parameter to the joystick mode; and when the pressure value is less than the threshold, setting the mode parameter to the stylus mode.

18. The touch sensitive processing method of claim 15, further comprising:

setting the second-axis tilt angle to a fixed value.

19. The touch sensitive processing method of claim 15, further comprising:

detecting, via the touch panel, a spin angle of the stylus with respect to the touch panel; and when the mode parameter indicates the joystick mode, transmitting the spin angle to the application via the joystick driver.

20. An electronic system for simulating a stylus as a joystick comprising:

a host including a memory and a central processing unit (CPU) connected with the memory, the CPU being configured for executing an operating system, a joystick driver and a touch sensitive driver run under the operating system, and an application connected to the joystick driver;

the stylus;

a touch panel; and a touch sensitive processing apparatus connected with the touch panel and the CPU for determining, via the touch panel, a position, an axial direction and a tilt angle of the stylus with respect to the touch panel, wherein the touch sensitive processing apparatus maintains a mode parameter to record an operating mode of the stylus, when the mode parameter indicates a joystick mode, the touch sensitive processing apparatus converts the axial direction and the tilt angle of the stylus into a first-axis tilt angle and a second-axis tilt angle, and transmits the first-axis and second-axis tilt angles to the application via the joystick driver, when the mode parameter indicates a stylus mode, the touch sensitive processing apparatus transmits the position to the touch sensitive driver, wherein the stylus includes an input device for allowing a user to set the mode parameter via the input device, the stylus transmits a status of the input device to the touch sensitive processing apparatus, wherein the input device includes a mechanical structure at a first end of the stylus, when under a pressure greater than a first threshold, the mechanical structure is deformed into a first status, when under another pressure greater than a second threshold, the mechanical structure is deformed into a second status, wherein the first status corresponds to the joystick mode, and the second status corresponds to the stylus mode.

21. An electronic system for simulating a stylus as a joystick comprising:

a host including a memory and a central processing unit (CPU) connected with the memory, the CPU being configured for executing an operating system, a joystick driver and a touch sensitive driver run under the operating system, and an application connected to the joystick driver;

the stylus;

a touch panel; and a touch sensitive processing apparatus connected with the touch panel and the CPU for determining, via the touch panel, a position, an axial direction and a tilt angle of the stylus with respect to the touch panel, wherein the touch sensitive processing apparatus maintains a mode parameter to record an operating mode of the stylus, when the mode parameter indicates a joystick mode, the touch sensitive processing apparatus converts the axial direction and the tilt angle of the stylus into a first-axis tilt angle and a second-axis tilt angle, and transmits the first-axis and second-axis tilt angles to the application via the joystick driver, when the mode parameter indicates a stylus mode, the touch sensitive processing apparatus transmits the position to the touch sensitive driver, wherein when a first end of the stylus is touching the touch panel, the touch sensitive processing apparatus sets the mode parameter to the joystick mode, and when a second end of the stylus is touching the touch panel, the touch sensitive processing apparatus sets the mode parameter to the stylus mode.

22. The electronic system of claim 21, wherein the first end and the second end of the stylus are provided with different touch sensitive areas, shapes or directionalities, such that the touch sensitive processing apparatus knows whether the first end or the second end is in contact with the touch panel.

23. The electronic system of claim 21, wherein the first end and the second end of the stylus emit different electrical signals, such that the touch sensitive processing apparatus knows whether the first end or the second end is in contact with the touch panel.

24. A touch sensitive processing apparatus for simulating a stylus as a joystick comprising:

a touch panel interface connected with electrodes of a touch panel;

a host interface connected with a central processing unit (CPU) of a host, the CPU being configured for executing an operating system, a joystick driver and a touch sensitive driver run under the operating system, and an application connected to the joystick driver; and a microprocessor connected with the touch panel interface and the host interface for determining, via the touch panel, a position, an axial direction and a tilt angle of a stylus with respect to the touch panel, wherein the microprocessor maintains a mode parameter to record an operating mode of the stylus, when the mode parameter indicates a joystick mode, the microprocessor converts the axial direction and the tilt angle of the stylus into a first-axis tilt angle and a second-axis tilt angle, and transmits the first-axis and second-axis tilt angles to the application via the joystick driver, when the mode parameter indicates a stylus mode, the microprocessor transmits the position to the touch sensitive driver, wherein the stylus includes an input device for allowing a user to set the mode parameter via the input device, the stylus transmits a status of the input device to the touch sensitive processing apparatus, the touch sensitive processing apparatus sets the mode parameter based on the status of the input device, wherein the input device includes a mechanical structure at a first end of the stylus, when under a pressure greater than a first threshold, the mechanical structure is deformed into a first status, when under another pressure greater than a second threshold, the mechanical structure is deformed into a second status, wherein the first status corresponds to the joystick mode, and the second status corresponds to the stylus mode.

25. The touch sensitive processing apparatus of claim 24, wherein the input device further includes a button on the stylus, when the button detects a touch event, the stylus transmits a status of the input device to the touch sensitive processing apparatus, the touch sensitive processing apparatus sets the mode parameter based on the status of the input device, wherein the touch event includes one of the following events:

a single click;

a double click; and a long press.

26. A touch sensitive processing apparatus for simulating a stylus as a joystick comprising:

a touch panel interface connected with electrodes of a touch panel;

a host interface connected with a central processing unit (CPU) of a host, the CPU being configured for executing an operating system, a joystick driver and a touch sensitive driver run under the operating system, and an application connected to the joystick driver; and a microprocessor connected with the touch panel interface and the host interface for determining, via the touch panel, a position, an axial direction and a tilt angle of a stylus with respect to the touch panel, wherein the microprocessor maintains a mode parameter to record an operating mode of the stylus, when the mode parameter indicates a joystick mode, the microprocessor converts the axial direction and the tilt angle of the stylus into a first-axis tilt angle and a second-axis tilt angle, and transmits the first-axis and second-axis tilt angles to the application via the joystick driver, when the mode parameter indicates a stylus mode, the microprocessor transmits the position to the touch sensitive driver, wherein when the touch sensitive processing apparatus detects that a first end of the stylus is touching the touch panel, the touch sensitive processing apparatus sets the mode parameter to the joystick mode, and when the touch sensitive processing apparatus detects that a second end of the stylus is touching the touch panel, the touch sensitive processing apparatus sets the mode parameter to the stylus mode.

27. The touch sensitive processing apparatus of claim 26, wherein the first end and the second end of the stylus are provided with different touch sensitive areas, shapes or directionalities, such that the touch sensitive processing apparatus knows whether the first end or the second end is in contact with the touch panel.

28. The touch sensitive processing apparatus of claim 26, wherein the first end and the second end of the stylus emit different electrical signals, such that the touch sensitive processing apparatus knows whether the first end or the second end is in contact with the touch panel.

29. A touch sensitive processing method for simulating a stylus as a joystick comprising:

maintaining a mode parameter to record an operating mode of the stylus;

determining, by a touch panel, a position, an axial direction and a tilt angle of the stylus with respect to the touch panel; and when a mode parameter indicates a joystick mode, converting the axial direction and the tilt angle of the stylus into a first-axis tilt angle and a second-axis tilt angle and transmitting them to an application via a joystick driver, when the mode parameter indicates a stylus mode, transmitting the position to a touch sensitive driver, wherein the joystick driver, the touch sensitive driver, and the application all run under an operating system executed by a central processing unit (CPU) of a host, wherein the stylus includes an input device for allowing a user to set the mode parameter via the input device, the touch sensitive processing method further includes:

receiving a status of the input device from the stylus; and setting the mode parameter based on the status of the input device, wherein the input device includes a mechanical structure at a first end of the stylus, when under a pressure greater than a first threshold, the mechanical structure is deformed into a first status, when under another pressure greater than a second threshold, the mechanical structure is deformed into a second status, wherein the first status corresponds to the joystick mode, and the second status corresponds to the stylus mode.

30. The touch sensitive processing method of claim 29, wherein the input device further includes a button on the stylus, the touch sensitive processing method further includes:

when the button detects a touch event, receiving the touch event from the stylus; and setting the mode parameter based on the touch event, wherein the touch event includes one of the following events:
a single click;
a double click; and
a long press.

31. A touch sensitive processing method for simulating a stylus as a joystick comprising:

maintaining a mode parameter to record an operating mode of the stylus;

determining, by a touch panel, a position, an axial direction and a tilt angle of the stylus with respect to the touch panel; and when a mode parameter indicates a joystick mode, converting the axial direction and the tilt angle of the stylus into a first-axis tilt angle and a second-axis tilt angle and transmitting them to an application via a joystick driver, when the mode parameter indicates a stylus mode, transmitting the position to a touch sensitive driver, wherein the joystick driver, the touch sensitive driver, and the application all run under an operating system executed by a central processing unit (CPU) of a host, when detecting a first end of the stylus is touching the touch panel, setting the mode parameter to the joystick mode; and when detecting a second end of the stylus is touching the touch panel, setting the mode parameter to the stylus mode.

32. The touch sensitive processing method of claim 31, further comprising:

determining whether the first end or the second end of the stylus is touching the touch panel based on different touch sensitive areas, shapes or directionalities of the first end and the second end of the stylus.

33. The touch sensitive processing method of claim 31, further comprising:

determining whether the first end or the second end of the stylus is touching the touch panel based on different electrical signals emitted by the first end and the second end of the stylus.

\* \* \* \* \*